(12) United States Patent
Gradstein et al.

(10) Patent No.: US 11,176,278 B2
(45) Date of Patent: Nov. 16, 2021

(54) EFFICIENT ROTATE ADDER FOR IMPLEMENTING CRYPTOGRAPHIC BASIC OPERATIONS

(71) Applicant: Intel Corporation, Santa Clara, CA (US)

(72) Inventors: Amit Gradstein, Binyamina (IL); Simon Rubanovich, Haifa (IL); Regev Shemy, Kiryat Ata (IL); Onkar P Desai, Mumbai (IN); Jose Yallouz, Haifa (IL)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 16/236,450

(22) Filed: Dec. 29, 2018

(65) Prior Publication Data

US 2020/0210625 A1 Jul. 2, 2020

(51) Int. Cl.
*G06F 21/72* (2013.01)
*H04L 9/06* (2006.01)

(52) U.S. Cl.
CPC ............ *G06F 21/72* (2013.01); *H04L 9/0643* (2013.01)

(58) Field of Classification Search
CPC .................................................... G06F 21/72
See application file for complete search history.

(56) References Cited

U.S. PATENT DOCUMENTS

| | | | |
|---|---|---|---|
| 9,865,337 B1* | 1/2018 | Ahmed | G11C 7/12 |
| 2005/0036618 A1* | 2/2005 | Gammel | G06F 7/00 |
| | | | 380/255 |
| 2009/0089556 A1* | 4/2009 | Lee | H03M 13/395 |
| | | | 712/223 |
| 2011/0231467 A1* | 9/2011 | Ahn | G06F 7/728 |
| | | | 708/491 |
| 2014/0181165 A1* | 6/2014 | Anderson | G06F 7/506 |
| | | | 708/209 |

* cited by examiner

*Primary Examiner* — Kambiz Zand
*Assistant Examiner* — Phuc Pham
(74) *Attorney, Agent, or Firm* — Nicholson De Vos Webster & Elliott LLP

(57) ABSTRACT

Integrated circuits to compute a result of summing m values, rotating the sum by k bits, and adding a summation of n values $B_i$ to $B_n$ to the rotated sum. An embodiment includes: a first carry save adder to add up the m values to generate a first carry and a first sum; rotator circuitry to rotate both the first carry and the first sum by k bits to generate a second carry and a second sum; a second carry save adder to add up the second carry, the second sum, and the summation of values $B_i$ to $B_n$ to generate a third carry and a third sum; two parallel adders to generate a first intermediate result and a second intermediary result based on the third carry and the third sum; and a multiplexer to generate the result utilizing various portions of the first and second intermediate results.

15 Claims, 15 Drawing Sheets

EFFICIENT ROTATE ADDER FOR IMPLEMENTING CRYPTOGRAPHIC BASIC OPERATIONS

TECHNICAL FIELD

Embodiments of the invention described herein relate generally to the hardware accelerator architecture in a computer processing system. In particular, the disclosure relates to an efficient rotate adder for implementing basic operations in cryptography.

BACKGROUND ART

A hash function is a mathematical algorithm that maps data of arbitrary size to a string of a fixed size. Various hash functions employed in cryptography combine between arithmetic and logic operations to achieve the mapping. A common operation encountered in cryptographic hash functions, such as SHA-1 and SM3, is a rotated addition of several arguments followed by an addition of another argument. Conventional hardware implementation of this operation typically utilizes multiple adders in a serial configuration. Given that the operations performed by adders tend to be very time-consuming, multiple adders in a serial arrangement constitutes a critical performance bottleneck.

BRIEF DESCRIPTION OF THE DRAWINGS

The invention may best be understood by referring to the following description and accompanying drawings that are used to illustrate embodiments of the invention. In the drawings.

DETAILED DESCRIPTION

Embodiments of system, method, and processor for an efficient rotate adder for implementing basic operations in cryptography are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the figures herein may be referred to by their labels in the figures, rather than by a particular reference number.

Various cryptography algorithms combine arithmetic and logic operations. A common operation found in cryptography algorithms, such as SHA-1 and SM3 Cryptographic Hash Functions, is a rotated addition of several arguments $A_1, \ldots, A_m$ followed by an addition with another several arguments $B_1, \ldots, B_n$. This is described by the mathematical expression:

$$[(A_1 + \ldots + A_m) <<< k] + (B_1 + \ldots + B_n)$$

where k is a constant for the left rotation. Traditionally, the hardware implementation of this expression requires two serial adders. Given that adders are critical time-consuming elements, adders in a serial configuration creates a latency bottleneck. Aspects of the present invention are directed to a special rotate adder that provides calculation for this common building block using two adders in parallel without too many extra hardware. When used to perform calculations in SHA-1 and SM3 x86 instructions, as much as a 50% reduction in latency have been observed.

Figure 1:
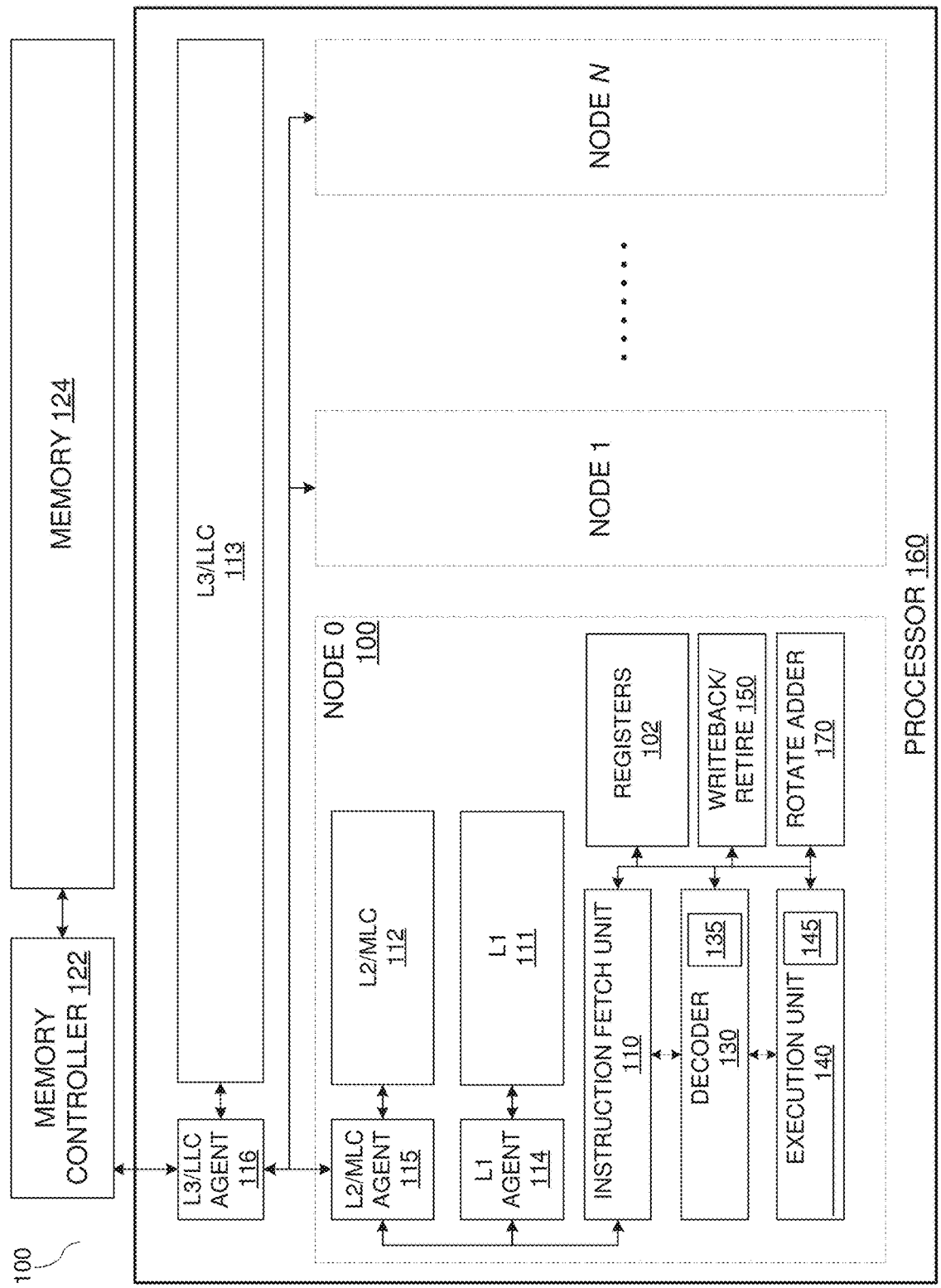
FIG. 1 is a block diagram illustrating an exemplary system on which embodiments of the present invention may be implemented.

FIG. 1 illustrates an exemplary system on which embodiments of the present invention may be implemented. System 100 includes processor 160 that is communicatively coupled to memory 124. Processor 160 may be a chip multi-processor (CMP) that includes one or more nodes. Each of the nodes may constitute or include a processor core (core), a logical processor, or a hardware thread. The details of a single node (i.e., node 0) are illustrated in FIG. 1 for simplicity. It will be understood, however, that each of the other nodes may have the same set of logic, components, circuitry, and/or configuration as node 0. For example, each node may include a set of registers 102, a level 1 cache (L1) 111, and a L2 (L2) or mid-level cache (MLC) 112. In some embodiments, processor 160 may further includes a level 3 (L3) cache or LLC 113 that is communicatively coupled to, and shared by, all the nodes. In other embodiments (not shown), the L3/LLC 113 is physically distributed and logically shared among the nodes. Each of L1, L2/MLC, and L3/LLC caches, according to an embodiment, is managed by a respective cache agent or controller (114-116) and usable for caching instructions and data according to a specified cache management policy. One or more cache agents or controllers may be used to perform the functions of a home agent, which may utilize directories to ensure and enforce cache coherence. In at least some embodiments, the cache management policy further includes a cache eviction/replacement policy. The instructions and data stored within the various processor caches are managed at the granularity of cache lines which may be a fixed size (e.g., 64, 128, 512 Bytes in length). Each node of the exemplary embodiments further includes an instruction fetch unit 110 for fetching instructions from main memory 124 via memory controller 122 and/or from the shared LLC 113 via L3/LLC agent 116; a decoder 130 for decoding the instructions (e.g., decoding program instructions into micro-operations or "uops"); an execution unit 140 for executing the decoded instructions; and a writeback unit 150 for retiring the instructions and writing back the results (e.g., to main memory 124). Furthermore, decoder 130 may include logic or circuitry 135 to decode a special rotated-addition instruction. Similarly, the execution unit 140 may also include logic or circuitry 145 to execute the decoded special rotate-add instructions. The rotated-addition instruction may include one or more operand. The operands may specify one or more memory addresses from which data is to be read. According to an embodiment, processor 160 may further include a special rotate-adder 170 to execute the rotated-addition instruction. While shown as separate components, it would be appreciated that the rotate-adder 170 may be implemented as part of the execution unit 140.

Figure 2:
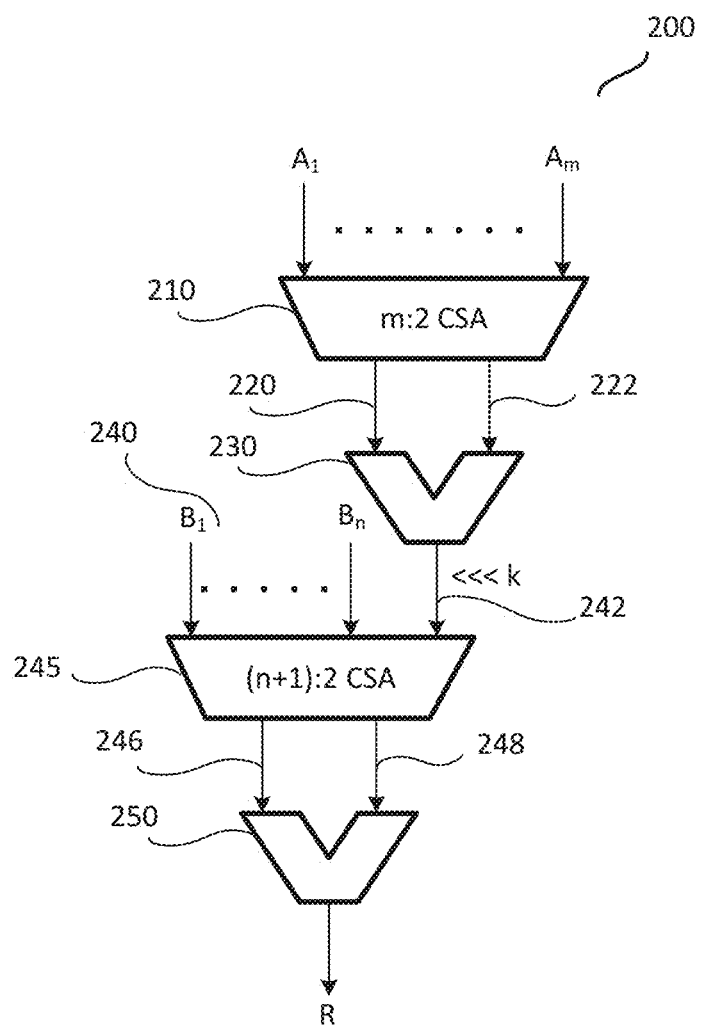
FIG. 2 illustrates an embodiment of a rotate adder that includes two adders in a serial configuration.

FIG. 2 illustrates an embodiment of a rotate adder that includes two adders in a serial configuration for calculating the expression $[(A_1+ \ldots +A_m)<<<k]+(B_1+ \ldots +B_n)$. Rotate adder 200 may be implemented by hardware including circuits or circuitry. It includes a carry save adder (CSA) 210, adder 230, and adder 250. The usage of a CSA is a desirable approach to speed up the addition operations of multiple operands. The CSA postpones the carry propagation calculations, which tends to be very time-consuming, to the final stage of the calculation, thus, calculating it only once. In FIG. 2, the CSA 210 adds up m number of l-bit values ($A_1$ through $A_m$) and generates a carry 220 and a sum 222. Adder 230 then sums up the carry 220 and the sum 222. The result is then rotated by a constant k to generate a rotated sum 242. A CSA 245 adds up n number of values 240 ($B_1$ through $B_n$) plus the rotated sum and generates a carry 246 and a sum 248. Adder 250 then sums up carry 246 and sum 248 to generate the result R. A disadvantage of this implementation is the latency created by adders 230 and 250. Since they are connected serially, adder 250 must wait for adder 230 to complete its operation before adder 250 can proceed. Since each adder are already very time-consuming elements, the serial configuration exacerbates the latency and decreases performance.

Figure 3:
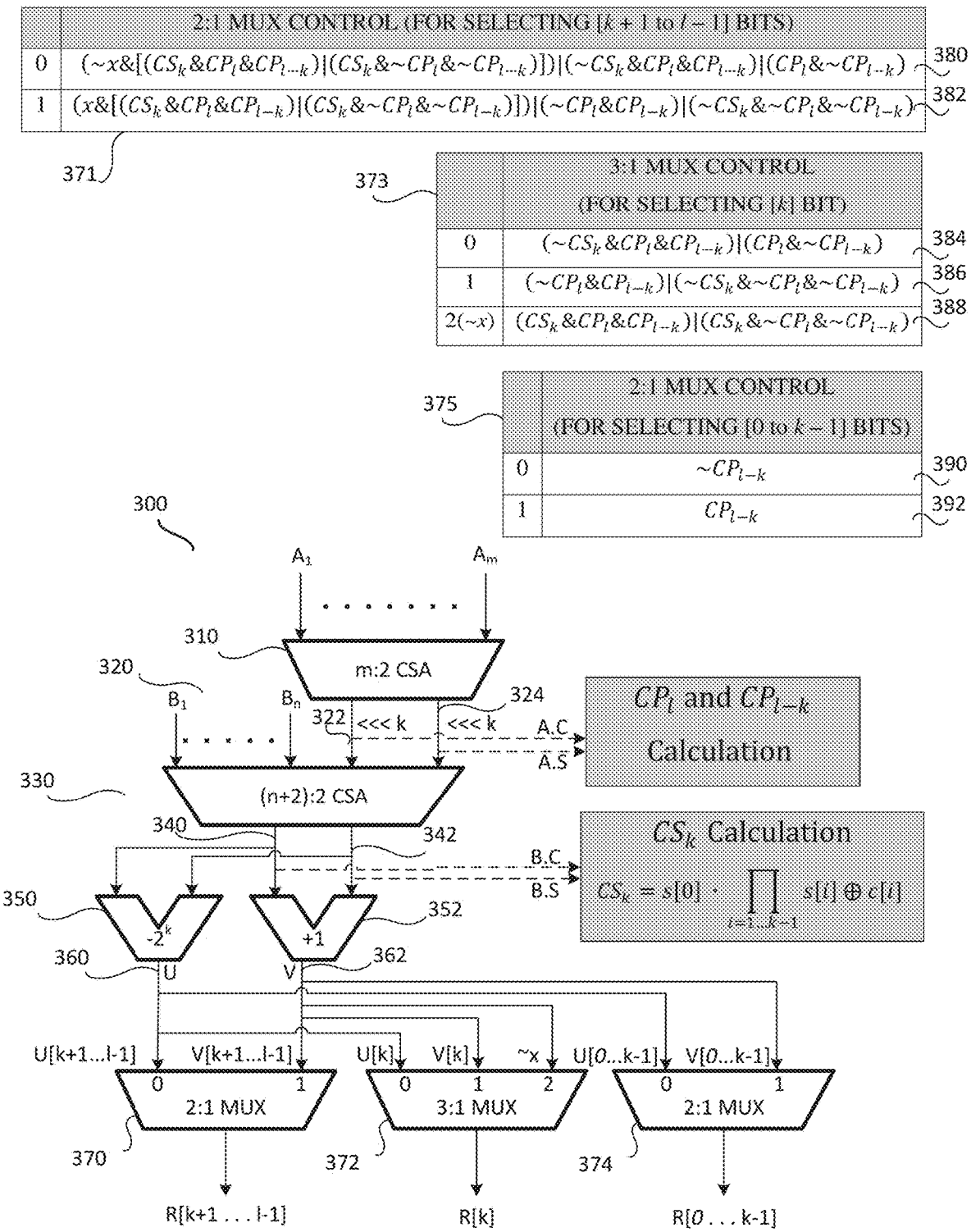
FIG. 3 illustrates an embodiment of a rotate adder that utilizes two adders in a parallel configuration.

FIG. 3 illustrates an embodiment of a rotate adder which utilizes adders in a parallel configuration. Rotate adder 300 constitutes the preferred embodiment. According to an embodiment, the rotate adder 300 calculates the result of an operation that includes a rotated addition of m number of arguments $A_1, \ldots, A_m$ followed by an addition with another n number of arguments $B_1, \ldots B_n$. This operation is described by mathematical expression $[(A_1+ \ldots +A_m) <<<k]+(B_1+ \ldots +B_n)$.

Unlike rotate adder 200 of FIG. 2, which includes two adders connected serially, rotate adder 300 utilizes two adders in parallel. This reduces latency as the two parallel adders may operate simultaneously (i.e. operate in the same clock cycle(s)). Rotate adder 300 may be implemented by hardware including circuits or circuitry. As illustrated, rotate adder 300 includes two CSAs 310 and 330, two adders 350 and 352, and 3 multiplexers (MUXs) 370, 372, and 374. It will be appreciated that the rotate adder 300 may include other components that are not shown.

The m-element to 2-element CSA 310 adds up m number of l-bit values $A_1$ through $A_m$ and generates two values—a first carry 322 and a first sum 324. The first carry 322 and the first sum 324 are then each rotated to the left by k bit positions, according to an embodiment. The rotated first carry and first sum may also be referred to as A.carry (A.c) and A.sum (A.s), respectively. The rotate operation may be performed by rotator circuitry (not shown) or re-arrangement of signal outputs from CSA 310. Next, the n+2 element to 2-element CSA 330 adds up the rotated first carry 322 and the rotated first sum 324, along with n number of values $B_1 \ldots B_n$ 320 to produce a second carry 340 and a second sum 342. The second carry and second sum may also be referred to as B.carry (B.c) and B.sum (B.s), respectively. A first adder 350 that is communicatively coupled to the CSA 330 calculates a first intermediate result 360 (U) which is the sum of the second carry 340 and the second sum 342 minus $2^k$. A second adder 352 that is also communicatively coupled to the CSA 330 calculates a second intermediate result 362 (V) which is the sum of the second carry 340 and the second sum 342 plus 1. According to an embodiment, the first adder 350 and second adder 352 may perform their respective operations in parallel as soon as the second carry 340 and the second sum 342 are available from CSA 330.

From there, the first and second intermediate results are passed to MUXs 370, 372, and 374. According to an embodiment, these three MUXs operate in different data widths and each contains a respective control. For MUX 370, it receives bits from bit positions k+1 to l−1 of the first intermediate result 360 and that of the second intermediate results 362. Based on the control value selected in accordance to the Boolean expressions listed in table 371, MUX 370 selects bits k+1 to l−1 from either the first intermediate result 360 or the second intermediate result 362. The selected bits are outputted as the corresponding bits (i.e. bits k+1 to l−1) for the final result R. For example, if the calculation of Boolean expression 380 results in 1, then control value 0 is used and bits k+1 to l−1 from the first intermediate result (i.e. second carry+second sum−$2^k$) are selected for output. If the calculation of Boolean expression 382 results in 1, then control value 1 is used and bits k+1 to l−1 from the second intermediate result (i.e. second carry+ second sum+1) are selected for output. Boolean expressions 380 and 382 are mutually exclusive, meaning that if one of them calculates to 1, then the other will be 0.

As for MUX 372, it receives the kth bit of the first and of the second intermediate result, as well as an inverse of the kth bit of the second intermediate result denoted by ~x, where ~x=$\overline{V[k]}$. Based on the control value selected in accordance to the Boolean expressions listed in table 373, MUX 372 selects the kth bit from either the first intermediate result 362 or the second intermediate result 362. The selected bit is outputted as the kth bit of the final result R. For example, if the calculation of Boolean expression 384 results in 1, then control value 0 is used and the kth bit from the first intermediate result (i.e. second carry+second sum−$2^k$) is selected for output. If the calculation of Boolean expression 386 results in 1, then control value 1 is used and the kth bit from the second intermediate result (i.e. second carry+second sum+1) is selected for output. Finally, if the calculation of Boolean expression 388 results in 1, then control value 2 is used and the inverse of the kth bit from the second intermediate result is selected for output. Boolean expressions 384, 386, and 388 are mutually exclusive. If one of them calculates to 1, then the other two will be 0. According to an embodiment, the inverse of the kth bit of the first intermediate result, rather than the second, may be used as ~x. It will be apparent from the discussion below that in the scenarios where ~x is selected for output, the kth bit of the first and second intermediate result are always equal.

With MUX 374, it receives from adders 350 and 352 bits 0 to k−1 of the first intermediate result 360 and that of the second intermediate result 362. Based on the control value selected in accordance to the Boolean expressions listed in table 375, MUX 374 selects bits 0 to k−1 from either the first intermediate result 360 or the second intermediate result 362. The selected bits are outputted as the corresponding bits (i.e. bits 0 to k−1) for the final result R. For example, if the calculation of Boolean expression 390 results in 1, then control value 0 is used and bits 0 to k−1 from the first intermediate result (i.e. second carry+second sum−$2^k$) are selected for output. If the calculation of Boolean expression 392 results in 1, then control value 1 is used and bits 0 to k−1 from the second intermediate result (i.e. second carry+second sum+1) are selected for output. Algorithms 390 and 392 are mutually exclusive in that only one of them will calculate to 1 at a time. The final result R is made up of the concatenated bits outputted from the three MUXs.

To control the MUXs, according to an embodiment, three different signals, $CP_l$, $CP_{l-k}$, and $CS_k$, are calculated. These signals serve as inputs for calculating the control signals for MUXs 370, 372, and 374. Signal $CP_{l-k}$ represents the carry propagation of the first l−k bits of CSA 310 result, i.e. carry 322 and sum 324. Signal $CP_l$ represents the full carry propagation of all bits of CSA 310 result, i.e. carry 322 and sum 324. Specifically, for a given sum, represented by s[l]=(sum[l−1], . . . , sum[0]), and a given carry, represented by c[l]=(carry[l−2], . . . , carry[0], 0), a carry propagation of the first i bits $CP_i$ can be calculated through the following recursive formula:

$$CP_0=0$$

$$CP_{i+1}=s[i] \cdot c[i]+CP_i(s[i] \oplus c[i])$$

Signal $CS_k$ represents the state where the first k bits of the second CSA 330 result, i.e. carry 340 and sum 342, are in at the propagation stage. Specifically, for a given sum, represented by s[l]=(sum[l−1], . . . , sum[0]), and a given carry, represented by c[l]=(carry[l−2], . . . , carry[0], 0), the state can be calculated by the equation:

$$CS_k=s[0] \cdot \Pi_{\{i=1 \ldots k-1\}} s[i] \oplus c[i]$$

According to an embodiment, the control signal for MUX 370 is determined based on the Boolean expressions:

| 0 | ( ~ (x &[($CS_k$ &$CP_l$ &$CP_{l-k}$) | ($CS_k$ & ~ $CP_l$ & − $CP_{l-k}$)]) | ( ~ $CS_k$ &$CP_l$ &$CP_{l-k}$) | ($CP_l$ &$CP_{l-k}$) |
|---|---|
| 1 | (x &[($CS_k$ &$CP_l$ &$CP_{l-k}$) | ($CS_k$ & ~ $CP_l$ &$CP_{l-k}$)]) | ( ~ $CP_l$ &$CP_{l-k}$) | ( ~ $CS_k$ & ~ $CP_l$ &$CP_{l-k}$) |

The control signal for MUX 372 is determined based on the Boolean expressions:

| 0 | ( ~ $CS_k$ &$CP_l$ &$CP_{l-k}$) | ($CP_l$ & ~ $CP_{l-k}$) |
|---|---|
| 1 | ( ~ $CP_l$ &$CP_{l-k}$) | ( ~ $CS_k$ & ~ $CP_l$ & ~ $CP_{l-k}$) |
| 2( ~ x) | ($CS_k$ &$CP_l$ &$CP_{l-k}$) | ($CS_k$ & ~ $CP_l$ &$CP_{l-k}$) |

Finally, the control signal for MUX 374 is determined based on the Boolean expressions:

| 0 | ~ $CP_{l-k}$ |
|---|---|
| 1 | $CP_{l-k}$ |

The following section provides the proof for the correctness of the special rotate adder (e.g. rotate adder 300). To begin, the operation implemented by the rotate adder is first defined by the definition 1.

Definition 1: Given m numbers $A_i$, i∈[1, m], a number C, and a constant k, an Addition Rotate Addition (ARA) operation is defined as addition of all $A_i$ to $A_m$ elements, rotated by k, followed by another addition with the summation of $B_i$ to $B_n$ elements, i.e. $[(\Sigma_{i=1}^{m} A_i)<<<k]+\Sigma_{i=1}^{n} B_i = [(A_1+ \ldots +A_m)<<<k]+(B_1+ \ldots +B_n)$.

Figure 4:
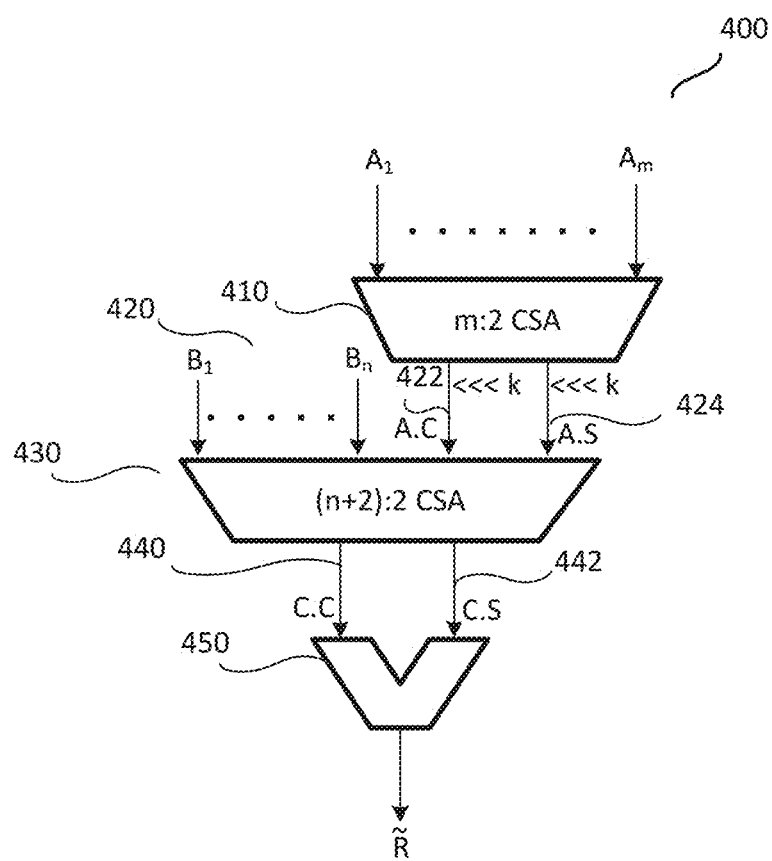
FIG. 4 illustrates an implementation through Carry Save Adder (CSA) where each redundant format output is rotated by k according to an embodiment.

As noted above, rotate adder 200 from FIG. 2 implements this operation, albeit in an inefficient manner as it utilized two serial adders. Nonetheless, it serves as a starting point from which improvements can be made. FIG. 4 illustrates a slightly different embodiment of the rotate adder 200 from FIG. 2, where each redundant format output is rotated by k and directly connected to a CSA. Unlike the rotate adder 200, the first rotated addition, i.e. $[(A_1+ \ldots +A_m)<<<k]$ in the rotate adder 400 is performed by CSA building blocks 410 and 430. The calculated result of rotate adder 400 is denoted as R̂, whereas the calculated result of rotate adder 200 is denoted as R. Note that R≠R̂.

Next, consider the unrotated results 422 and 424 of CSA 410 in FIG. 4 and use them to define arguments $CP_{l-k}$ and $CP_l$. $CP_l$ is defined as the full carry propagation of all l bits of CSA 410 result, i.e. carry 422 and sum 424. $CP_{l-k}$ is defined as the carry propagation of the first l−k bits of CSA 410 result, i.e. carry 422 and sum 424. Specifically, for a given sum, represented by s[l]=(sum[l−1], . . . , sum[0]), and a given carry, represented by c[l]=(carry[l−2], . . . , carry[0], 0), a carry propagation of the first i bits $CP_i$ can be calculated through the following recursive formula:

$$CP_0=0$$

$$CP_{i+1}=s[i] \cdot c[i]+CP_i(s[i] \neq c[i])$$

To characterize the relationship between the two rotate adder implementations presented in FIGS. 2 and 4, the following theorem is proposed:

Theorem 1: Given $CP_{l-k}$ and $CP_l$, the relationship between result R (from 200) and $\tilde{R}$ (from 400) may be expressed as.

$$R = \tilde{R} + CP_{l-k} - (CP_l \lll k)$$

When $CP_{l-k}=1$, the propagation of this carry is ignored by rotated adder 400 due to the rotation in redundant format. Therefore, it should be added to the final result (note the addition of $CP_{l-k}$). On the other hand, when that $CP_l=1$, the propagation of this carry is considered by the rotate adder 400 when it actually should be ignored. As such, $CP_l$ should be subtracted (with a k shift) from the final result (note the subtraction of $(CP_l \ll k)$).

Figure 5:
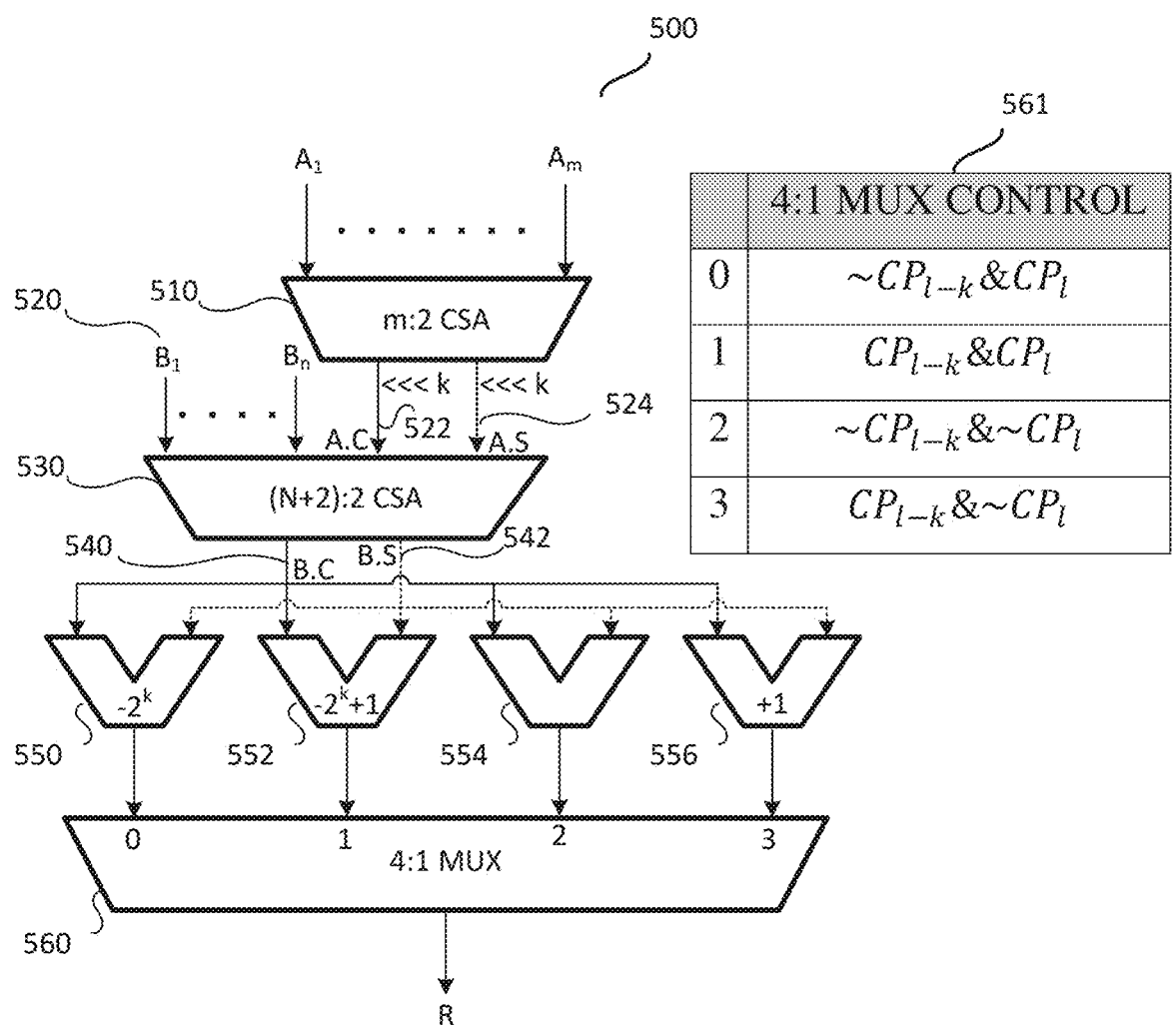
FIG. 5 illustrates yet another embodiment of a rotate adder that employs four adders in a parallel configuration.

Theorem 1 gives rise to a simplified implementation for calculating ARA operation. This implementation is illustrated in FIG. 5. According to an embodiment, rotate adder 500 expands upon rotate adder 200 by replacing the single adder 450 with four adders 550, 552, 554, and 556. Each of the four adders generates one of the possible results of the ARA operation. A 4:1 MUX 560 then selects the desired correct result R out of the 4 possible results based on the formulas given in table 561. Although this implementation arrives at the correct result and reduces the calculation latency, the high area demand associated with the 4 parallel adders (550, 552, 554, and 556) may not be a desirable tradeoff. By utilizing the similar approach, each of the embodiments below further reduces the number of adders required through several mathematical manipulations.

In another embodiment, the ARA operation may be implemented in a rotate adder with just 3 parallel adders. To achieve this, the carry and sum outputs of the second 3:2 CSA 530, termed as B.carry (B.c) and B.sum (B.s), are utilized in order to provide an important relation between the different adders results. In addition, a state, $CS_k$, is defined as the state in which the first k bits of B.sum and B.carry (shifted by 1) of a CSA are in at the propagation stage. Specifically, for a given sum, represented by $s[l]=(sum[l-1], \ldots, sum[0])$, and given carry, defined as $c[l]=(carry[l-2], \ldots, carry[0], 0)$, the special state, $CS_k$, can be calculated by $CS_k = s[0] \cdot \Pi\{i=1 \ldots k-1\} s[i] \oplus c[i]$. Further, by denoting that $c[0]$ is always equal to 0, it need not be considered in the equation. Next, let's consider the following lemma:

Lemma 1: Given are the outputs of a CSA, i.e. sum and carry, a constant k and $CS_k$. The results of $R_{sc}$=sum+carry, $R_{sc1}$=sum+carry+1, $R_{sck}$=sum+carry+$2^k$, and are such that.

(1) if $CS_k=0$, bits $[k, \ldots, l-1]$ of expressions sum+carry and sum+carry+1 are equal, i.e $R_{sc}[k, \ldots, l-1]=R_{sc1}[k, \ldots, l-1]$.

(2) if $CS_k=1$, bits $[k, \ldots, l-1]$ of expressions (sum+carry+1) and (sum+carry+$2^k$) are equal, i.e $R_{sc1}[k, \ldots, l-1]=R_{sck}[k, \ldots, l-1]$.

To prove lemma 1, let's consider (1). It is clear that the only scenario in which the bits $R_{sc}[k, \ldots, l-1]$ $R_{sc1}[k, \ldots, l-1]$.is when the carry of the first k bits of the two expressions (i.e. $R_{sc}[0, \ldots, k-1]$ and $R_{sc1}[0, \ldots, k-1]$) are different. Assume the carry of the first k bits are denoted by $C_{sc}^k$ and $C_{sc1}^k$, respectively. When $C_{sc}^k=0$ and $C_{sc1}^k=1$, bits $s[0]$ must be equal to 1 and $\forall i \in [1, k-1]$ all bits $s[i]$ and $c[i]$ must be in propagate state (i.e. $s[i] \oplus c[i]=1$). This is exactly the case when $CS_k=1$. Next, consider the other scenario where $C_{sc}^k=1$ and $C_{sc1}^k=0$. This scenario can be quickly eliminated because it implies that sum+carry >sum+carry+1, which cannot be valid.

To prove (2), let's consider the result of (1), which shows that the only scenario in which $R_{sc}[k, \ldots, l-1] \neq R_{sc1}[k, \ldots, l-1]$ is when $CS_k=1$. This then implies that $C_{sc}^k=0$ and $C_{sc1}^k=1$. The propagation of $C_{sc1}^k=1$ happens to exactly equal to adding $2^k$ to $R_{sc}$ expression and implies that $R_{sc1}[k, \ldots, l-1]=R_{sck}[k, \ldots, l-1]$.

Figure 6:
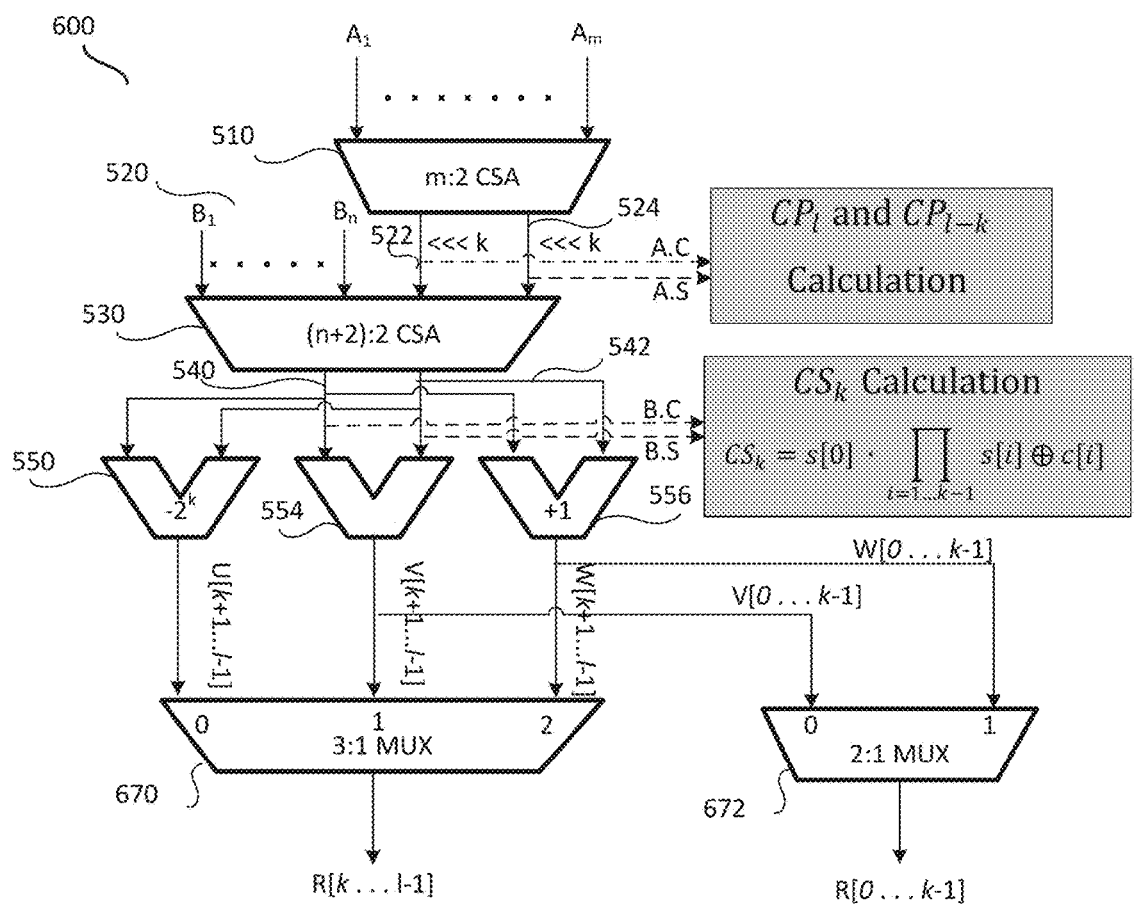
FIG. 6 illustrates an embodiment of a rotate adder that employs three adders in a parallel configuration.

By employing Lemma 1 in FIG. 5, the result of Adder–$2^k+1$ (552) can be constructed through the other results as depicted in FIG. 6. Specifically, in rotate adder 600, a 2:1 mux 672 selects the first $[0 \ldots k-1]$ bits and a 3:1 mux 670 selects the next $[k \ldots l-1]$ bits. The controls for each MUX to select between the three different adders (550, 554, and 556) are provided in the associated tables. For example, the Boolean expressions in table 671 are used to calculate the control signal for MUX 670 and the Boolean expressions in table 675 are used to calculate the control signal for MUX 672. The Boolean expressions in each table are mutual exclusive meaning that if one of them calculates to 1 then the others will calculate to 0.

To provide further optimization, let's consider another theorem:

Theorem 2: Given $CP_{l-k}$, $CP_l$, and $CS_k$, an implementation that utilizes 4 adders, such as the one depicted in FIG. 7, and an implementation that utilizes 3 adders, such as the one depicted in FIG. 6, produce the same result R.

Theorem 2 can be proved by showing that adder 552, which calculates the expression $\tilde{R}-2^k+1$ (or $\tilde{R}+1-2^k$), can be eliminated by employing lemma 1. Specifically, in the case that $CS_k=0$, bits $[k \ldots l-1]$ of expression $\tilde{R}-2^k+1$ and $\tilde{R}-2^k$ are equal. On the other hand, in the case that $CS_k=1$, bits $[k \ldots l-1]$ of expression $\tilde{R}-2^k+1$ and $\tilde{R}$ are equal. With respect to bits $[0 \ldots k-1]$, they are selected according to $CP_{l-k}$, as previously described.

Moreover, Lemma 1 implies that for bits $[k \ldots l-1]$, the result of the adder 554 and adder 556 are equal for $CS_k=0$. Thus, the Boolean expressions in table 673 (instead of table 671) can used to calculate the control signal for MUX 670.

Next, we consider another lemma:

Lemma 2: Given two bit-wise representations of two number (A–1 and A+1) whose difference is two, the following is true:

(1) The lower bit x of A–1 and A+1 are equal.

Figure 7:
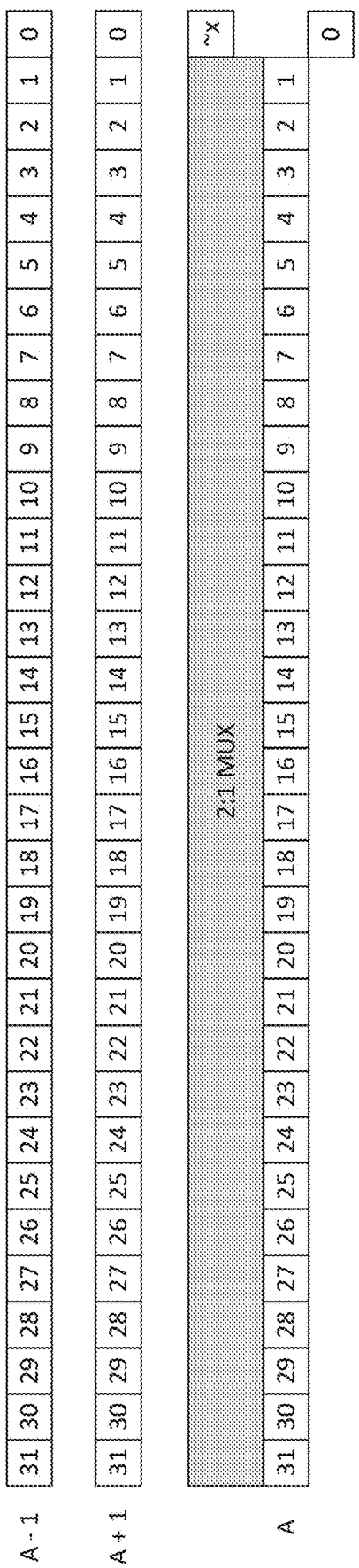
FIG. 7 illustrates the bit-wise arrangement of the relationship between two consecutive numbers of difference 2 and their intermediate number.

(2) The intermediate number, A, can be expressed through the design shown in FIG. 7, where ~x is both the MUX selector and the lower bit of the result.

To prove (1), without loss of generality, consider the bit representation of four sequential numbers 100, 101, 110, and 111. It is apparent that any two numbers whose difference is two has the same lower bit. For instance, bit representations 100 and 110, which corresponds to values 4 and 6, have the same lower bit 0. Bit representations 101 and 111, which corresponds to values 5 and 7, have the same lower bit 1. As such, the lower bit of A–1 and A+1 must be equal, proving the first claim.

To prove (2), assume x is the lower bit of A–1 and A+1. It then follows that the lower bit of A must be ~x (i.e. the inverse of x). Next, consider for example four sequential numbers 100, 101, 110 and 111. For the scenario that x=0, the higher $[1 \ldots l-1]$ bits of A are equal to those of A–1 because the addition of 1 to A–1 does not affect its higher $[1 \ldots l-1]$ bits, e.g. 100 and 101 in our example. For the scenario that x=1, the higher $[1 \ldots l]$ bits of A are the same as those of A+1 since the subtraction of 1 from A+1 does not affect its higher $[1 \ldots l-1]$ bits, e.g. 111 and 110 in our example.

Figure 8:
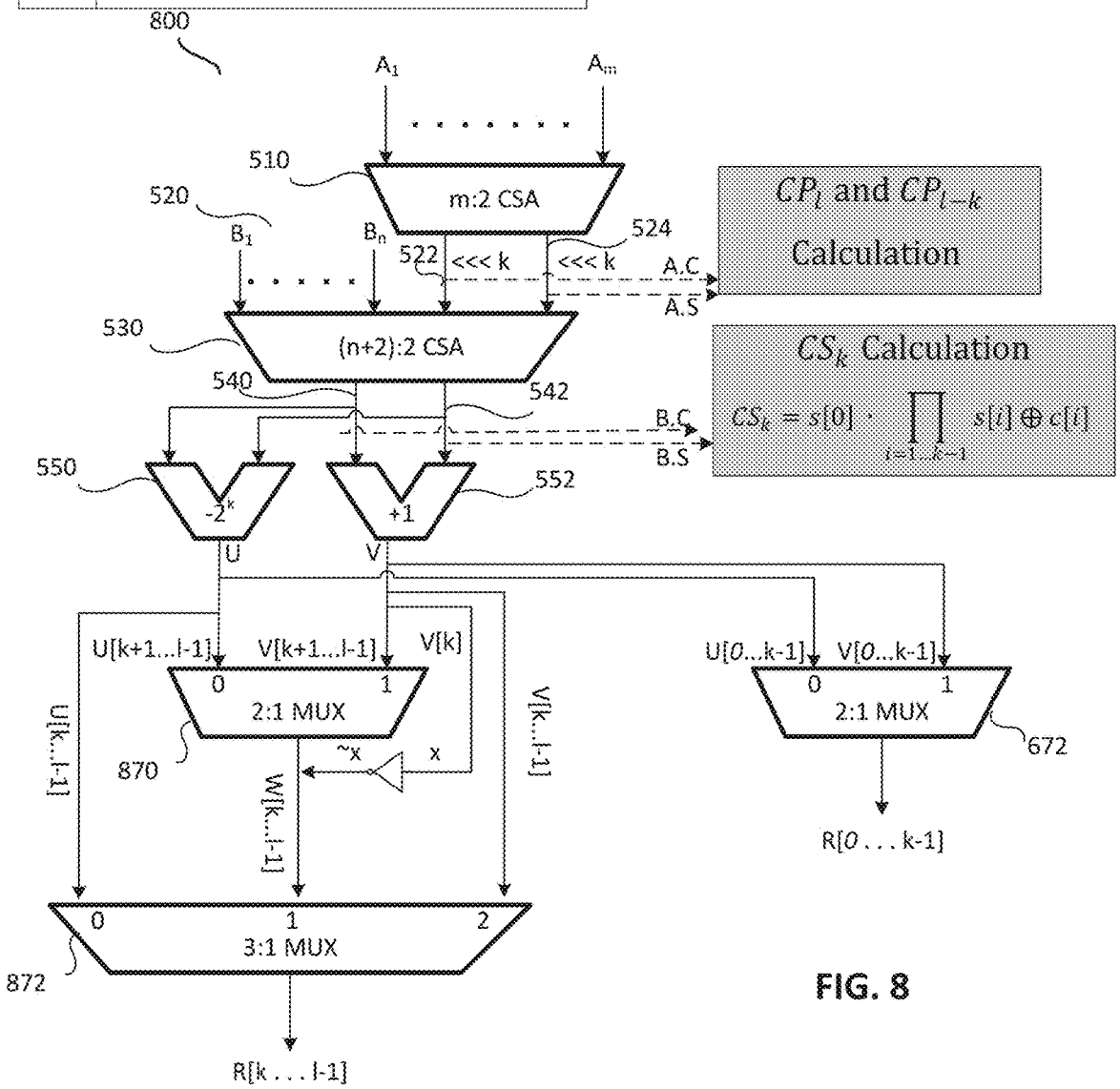
FIG. 8 illustrates an embodiment of a rotate adder that utilizes two adders in a parallel configuration along with three MUXs, where two of the MUXs are in a serial configuration.

Now consider another theorem:

Theorem 3: Given $CP_{l-k}$, $CP_l$, $CS_k$ and x, where x is the value of the $k^{th}$ result bit, an implementation that utilizes 3 adders, such as the one depicted in FIG. 6, and an implementation that utilizes 2 adders, such as the one depicted in FIG. 8, produce the same result R.

To prove theorem 3, lets recall that the control for selecting bits [k, . . . , l−1] of the simple adder 554 is $(CS_k \& CP_l \& CP_{l-k}) | (CS_k \& \sim CP_l \& \sim CP_{l-k})$ 680. Thus, this adder should be selected only in the case that $CS_k=1$. Now consider Lemma 1, when $CS_k=1$, bits [k, . . . , l−1] of Adder+1 and Adder+$2^k$ are equal. Thus, for this specific case, by employing Lemma 1, bits [k, . . . , l−1] of the simple adder 554 can be build using the results of Adder−$2^k$ 550 and Adder+$2^k$ (which employs the same result as Adder+1 556.) Therefore, the simple adder 554 can be eliminated.

Finally, by connecting the control bits of the MUXs which selects the [k, . . . , l−1] higher bits, we arrive at the implementation presented in FIG. 3 and Corollary 1.

Corollary 1: The implementation depicted in FIG. 3 provides the result of the ARA operation=$[(A_1+ \ldots +A_m)<<<k]+ (B_1+ \ldots +B_n)$.

An example of the present invention is an integrated circuit to compute an l-bit result of summing m values, rotating the sum by k bits to the left, and adding a summation of $B_i$ to $B_n$ elements to the rotated sum. The circuit includes: a first carry save adder to add up the m values to generate a first carry and a first sum; rotator circuitry to rotate the first carry by k bits to the left to generate a second carry, the rotator circuitry further to rotate the first sum by k bits to the left to generate a second sum; a second carry save adder to add up the second carry, the second sum, and the summation of $B_i$ to $B_n$ to generate a third carry and a third sum; a first of two parallel adders to generate a first intermediate result comprising the third carry plus the third sum minus $2^k$; a second of two parallel adders to generate a second intermediate result comprising the third carry plus the third sum plus 1; a first multiplexer (MUX) to generate bits k+1 to l−1 of the result based on the first and second intermediate results; a second MUX to generate bit k of the result based on the first and second intermediate results; and a third MUX to generate bits 0 to k−1 of the result based on the first and second intermediate results. The integrated circuit may further include a MUX control logic to generate control signals for the first, second and third MUXs. The MUX control logic may generate control signals based on a set of signals comprising $CP_{l-k}$, $CP_l$, and $CS_k$ signals. The $CP_{l-k}$ signal may include a portion of the carry propagation of the first carry and the first sum. The $CP_l$ signal may include a full portion of the carry propagation of the first carry and the first sum. The $CS_k$ signal may include a state in which the first k bits of the third carry and the third sum are in at a propagation stage. The set of control signals may further include an x signal, which is the $k^{th}$ bit of the second intermediate result.

The first MUX may generate bits k+1 to l−1 of the result by selecting corresponding bits from either the first intermediate result or the second intermediate result based on a first control signal generated by the MUX control logic. The first control signal may be set to a first sub-signal when a 1 is calculated from logic expression:

$(\sim x \& [(CS_k \& CP_l \& CP_{l-k}) | (CS_k \& \sim CP_l \& \sim CP_{l-k})]) | (\sim CS_k \& CP_l \& CP_{l-k}) | (CP_l \& \sim CP_{l-k})$.

Alternatively, the first control signal may be set to a second sub-signal when a 1 is calculated from logic expression:

$(x \& [(CS_k \& CP_l \& CP_{l-k}) | (CS_k \& \sim CP_l \& \sim CP_{l-k})]) | (\sim CP_l \& CP_{l-k}) | (\sim CS_k \& \sim CP_l \& \sim CP_{l-k})$.

The first MUX may select bits from the first intermediate result when the first control signal is set to the first sub-signal, and may select bits from the second intermediate result when the first control signal is set to the second sub-signal.

The second MUX may generate bit k of the result by selecting bit k from the first intermediate result, bit k from the second intermediate result, or an inverse of the bit k from the second intermediate result based on a second control signal generated by the MUX control logic. The second control signal may be set to a third sub-signal when a 1 is calculated from logic expression:

$(\sim CS_k \& CP_l \& CP_{l-k}) | (CP_l \& \sim CP_{l-k})$.

Alternatively, the second control signal may be set to a fourth sub-signal when a 1 is calculated from logic expression:

$(\sim CP_l \& CP_{l-k}) | (CS_k \& \sim CP_l \& CP_{l-k})$.

The second control signal may also be set to a fifth sub-signal when a 1 is calculated from logic expression:

$(CS_k \& CP_l \& CP_{l-k}) | (CS_k \& \sim CP_l \& \sim CP_{l-k})$.

The second MUX may select bit k from the first intermediate result when the second control signal is set to the third sub-signal. Alternatively, the second MUX may select bit k from the second intermediate result when the second control signal is set to the fourth sub-signal, and the inverse of the bit k from the second intermediate result when the control signal is set to the fifth sub-signal. The second MUX may also select the inverse of the bit k from the first intermediate result instead of the second intermediate result when the second control signal is set to the fifth sub-signal.

The third MUX may generate bits 0 to k−1 of the result by selecting corresponding bits from either the first intermediate result or the second intermediate result based on a third control signal generated by the MUX control logic. The third control signal may be set to a sixth sub-signal when a 1 is calculated from logic expression:

$\sim CP_{l-k}$.

Alternatively, the third control signal may be set to a seventh sub-signal when a 1 is calculated from logic expression:

$CP_{l-k}$.

The third MUX may select bits from the first intermediate result when the third control signal is set to the sixth sub-signal, and may select bits from the second intermediate result when the third control signal is set to the seventh sub-signal. The rotator circuitry may generate the second carry and the second sum in parallel.

Figure 9:
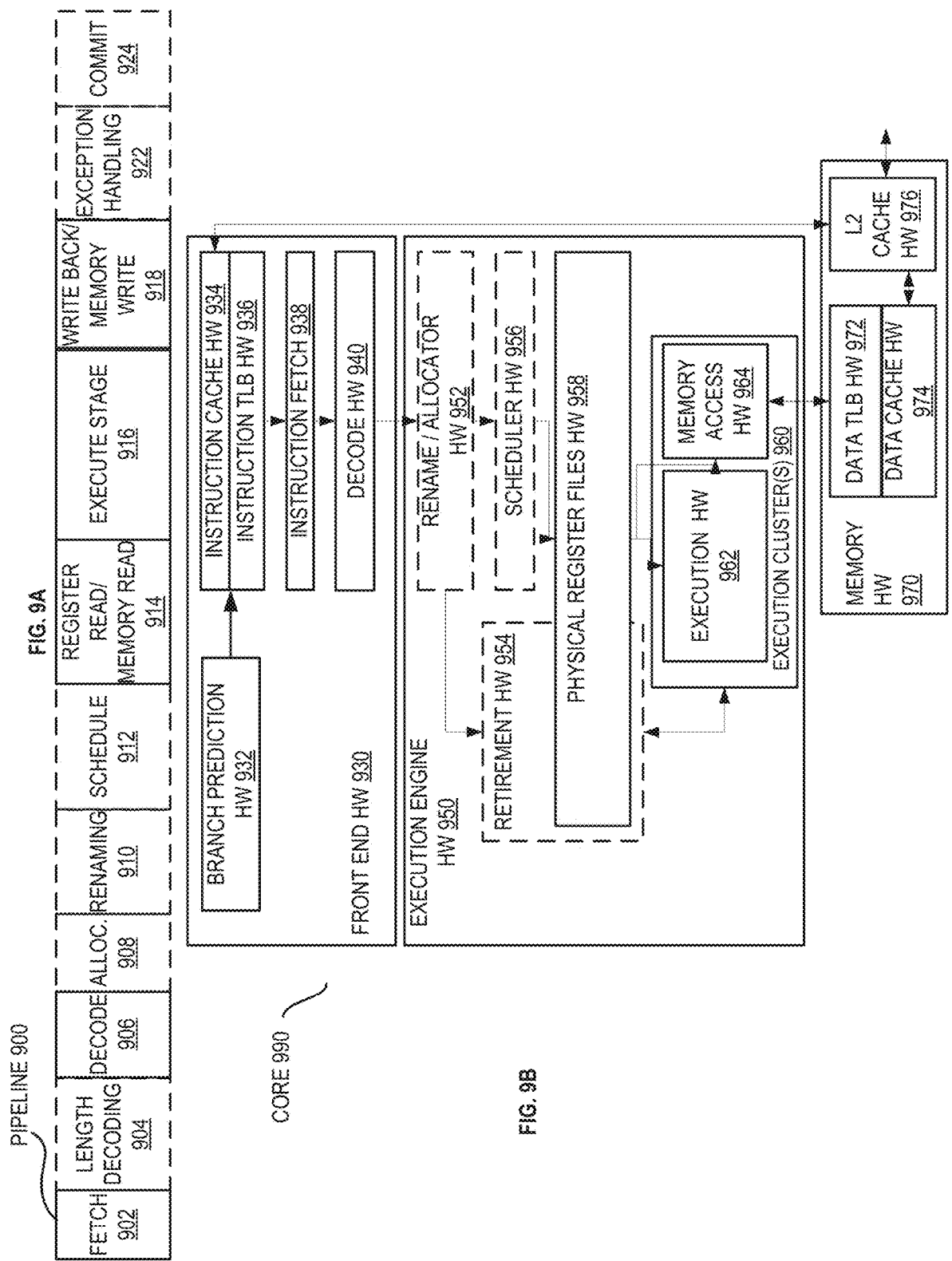
FIG. 9A is a block diagram illustrating both an exemplary in-order pipeline and an exemplary register renaming, out-of-order issue/execution pipeline according to embodiments of the invention.
FIG. 9B is a block diagram illustrating both an exemplary embodiment of an in-order architecture core and an exemplary register renaming, out-of-order issue/execution architecture core to be included in a processor according to embodiments of the invention.

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end hardware 930 coupled to an execution engine hardware 950, and both are coupled to a memory hardware 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end hardware 930 includes a branch prediction hardware 932 coupled to an instruction cache hardware 934, which is coupled to an instruction translation lookaside buffer (TLB) 936, which is coupled to an instruction fetch hardware 938, which is coupled to a decode hardware 940. The decode hardware 940 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode hardware 940 or otherwise within the front end hardware 930). The decode hardware 940 is coupled to a rename/allocator hardware 952 in the execution engine hardware 950.

The execution engine hardware 950 includes the rename/allocator hardware 952 coupled to a retirement hardware 954 and a set of one or more scheduler hardware 956. The scheduler hardware 956 represents any number of different schedulers, including reservations stations, central instruction window, etc. The scheduler hardware 956 is coupled to the physical register file(s) hardware 958. Each of the physical register file(s) hardware 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 958 comprises a vector registers hardware, a write mask registers hardware, and a scalar registers hardware. This register hardware may provide architectural vector registers, vector mask registers, and general purpose registers. The physical register file(s) hardware 958 is overlapped by the retirement hardware 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 954 and the physical register file(s) hardware 958 are coupled to the execution cluster(s) 960. The execution cluster(s) 960 includes a set of one or more execution hardware 962 and a set of one or more memory access hardware 964. The execution hardware 962 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 956, physical register file(s) hardware 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 964). It should also be understood that where separate pipelines are used, one or more of these pipelines may be out-of-order issue/execution and the rest in-order.

The set of memory access hardware 964 is coupled to the memory hardware 970, which includes a data TLB hardware 972 coupled to a data cache hardware 974 coupled to a level 2 (L2) cache hardware 976. In one exemplary embodiment, the memory access hardware 964 may include a load hardware, a store address hardware, and a store data hardware, each of which is coupled to the data TLB hardware 972 in the memory hardware 970. The instruction cache hardware 934 is further coupled to a level 2 (L2) cache hardware 976 in the memory hardware 970. The L2 cache hardware 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode hardware 940 performs the decode stage 906; 3) the rename/allocator hardware 952 performs the allocation stage 908 and renaming stage 910; 4) the scheduler hardware 956 performs the schedule stage 912; 5) the physical register file(s) hardware 958 and the memory hardware 970 perform the register read/memory read stage 914; the execution cluster 960 perform the execute stage 916; 6) the memory hardware 970 and the physical register file(s) hardware 958 perform the write back/memory write stage 918; 7) various hardware may be involved in the exception handling stage 922; and 8) the retirement hardware 954 and the physical register file(s) hardware 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 934/974 and a shared L2 cache hardware 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 10:
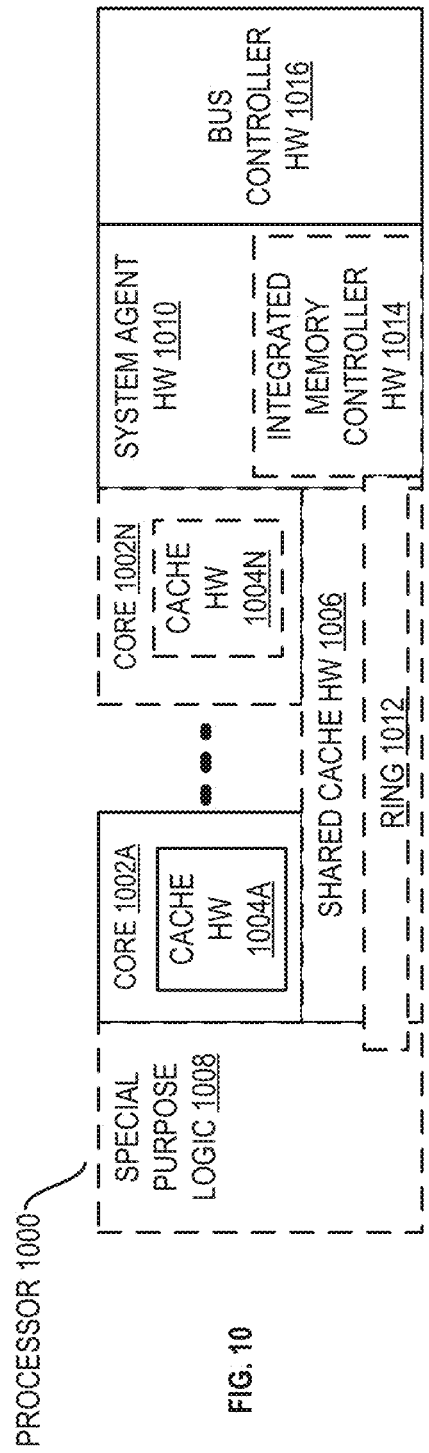
FIG. 10 is a block diagram of a single core processor and a multicore processor with integrated memory controller and graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller hardware 1016, while the optional addition of the dashed lined boxes illustrates an alternative processor 1000 with multiple cores 1002A-N, a set of one or more integrated memory controller hardware 1014 in the system agent hardware 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1006, and external memory (not shown) coupled to the set of integrated memory controller hardware 1014. The set of shared cache hardware 1006 may include one or more mid-level caches, such as level 2 (L2), level 3 (L3), level 4 (L4), or other levels of cache, a last level cache (LLC), and/or combinations thereof. While in one embodiment a ring based interconnect hardware 1012 interconnects the integrated graphics logic 1008, the set of shared cache hardware 1006, and the system agent hardware 1010/integrated memory controller hardware 1014, alternative embodiments may use any number of well-known techniques for interconnecting such hardware. In one embodiment, coherency is maintained between one or more cache hardware 1006 and cores 1002-A-N.

In some embodiments, one or more of the cores 1002A-N are capable of multi-threading. The system agent 1010 includes those components coordinating and operating cores 1002A-N. The system agent hardware 1010 may include for example a power control unit (PCU) and a display hardware. The PCU may be or include logic and components needed for regulating the power state of the cores 1002A-N and the integrated graphics logic 1008. The display hardware is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set. In one embodiment, the cores 1002A-N are heterogeneous and include both the "small" cores and "big" cores described below.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
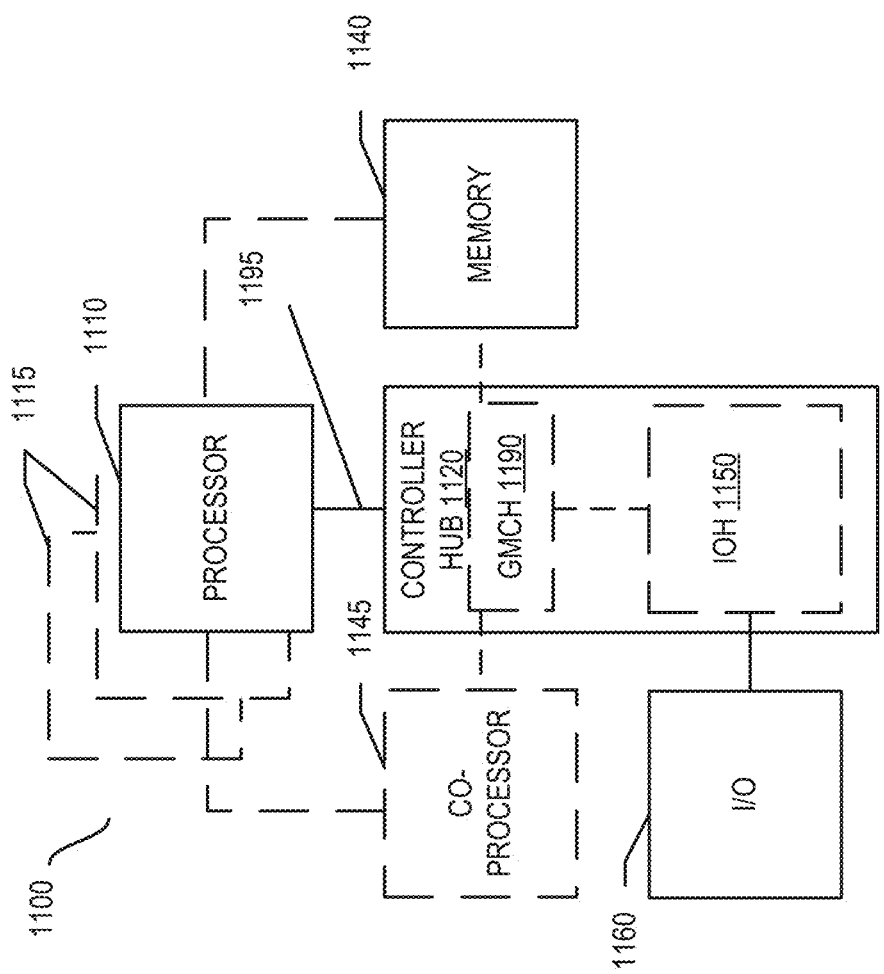
FIG. 11 illustrates a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface, or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
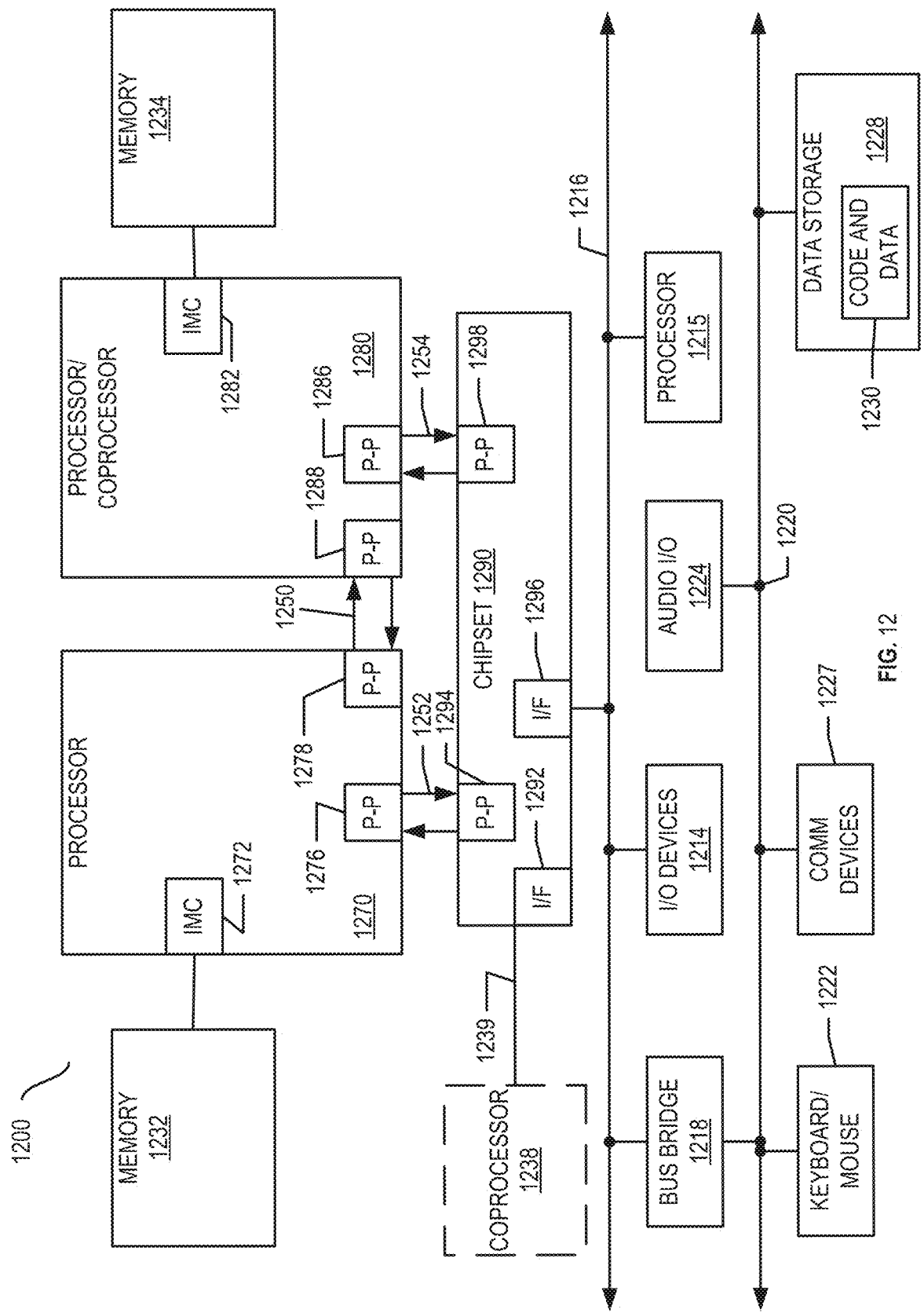
FIG. 12 illustrates a block diagram of a second system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) hardware 1272 and 1282, respectively. Processor 1270 also includes as part of its bus controller hardware point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) hardware), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage hardware 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
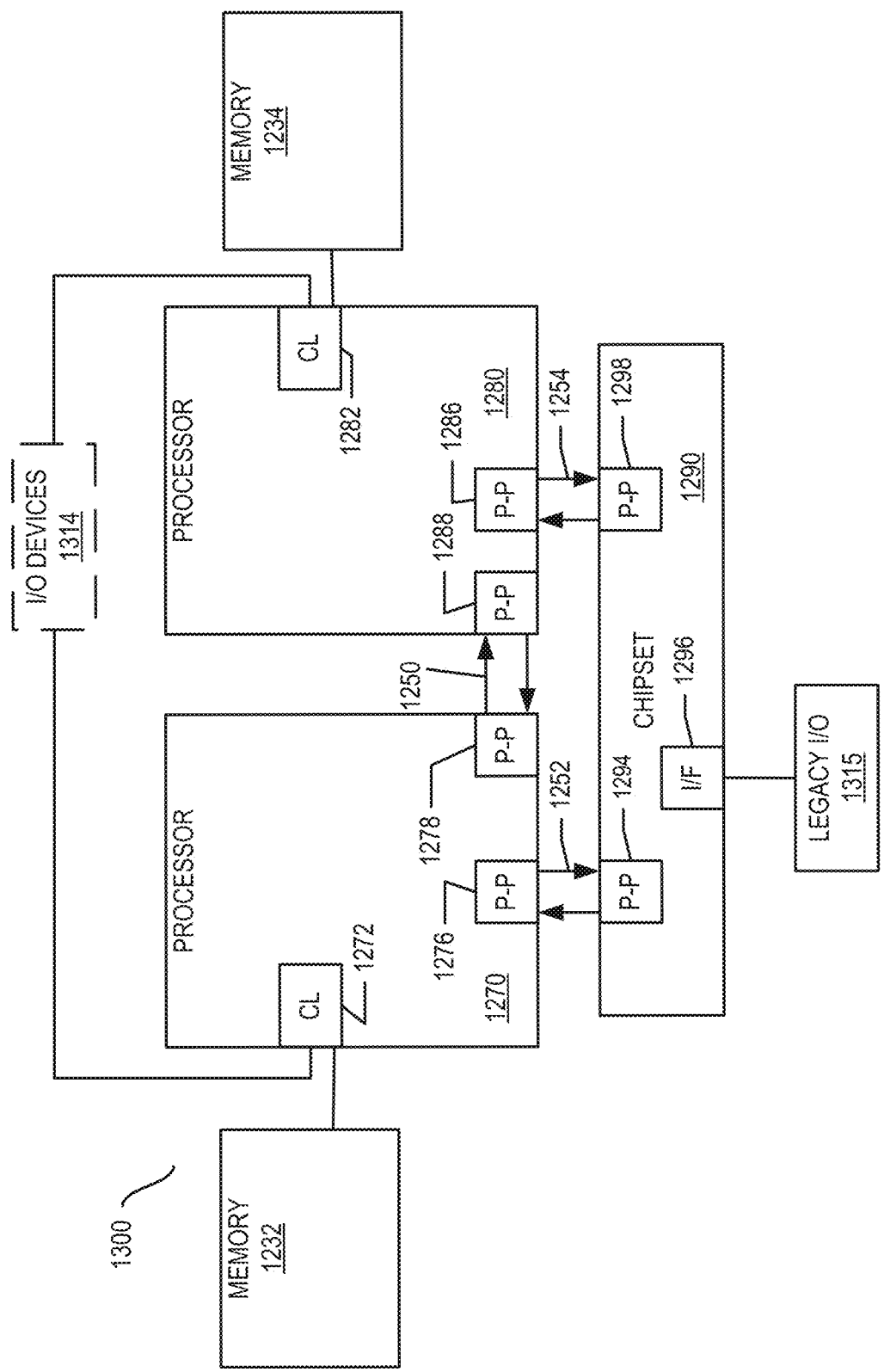
FIG. 13 illustrates a block diagram of a third system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller hardware and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
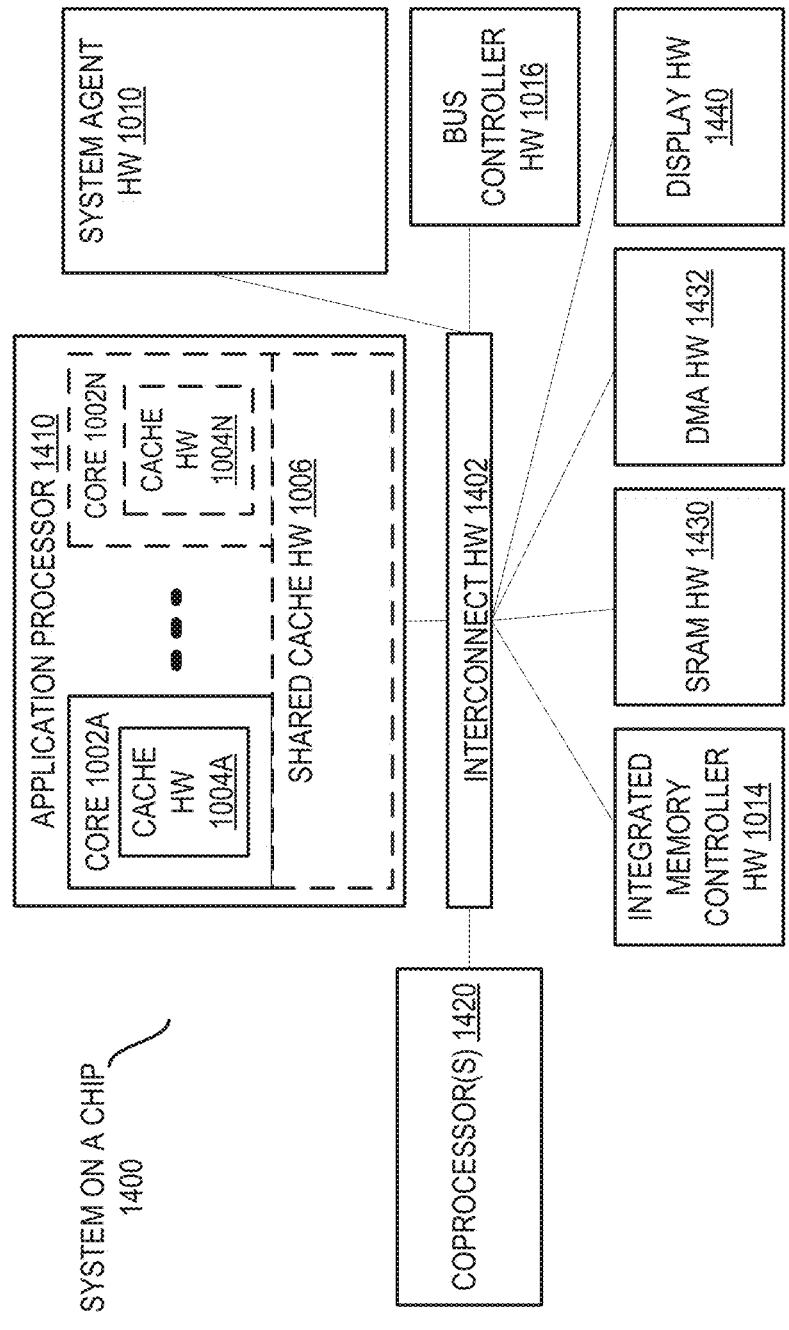
FIG. 14 illustrates a block diagram of a system on a chip (SoC) in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect hardware 1402 is coupled to: an application processor 1410 which includes a set of one or more cores 1002A-N and shared cache hardware 1006; a system agent hardware 1010; a bus controller hardware 1016; an integrated memory controller hardware 1014; a set or one or more coprocessors 1420 which may include integrated graphics logic, an image processor, an audio processor, and a video processor; an static random access memory (SRAM) hardware 1430; a direct memory access (DMA) hardware 1432; and a display hardware 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
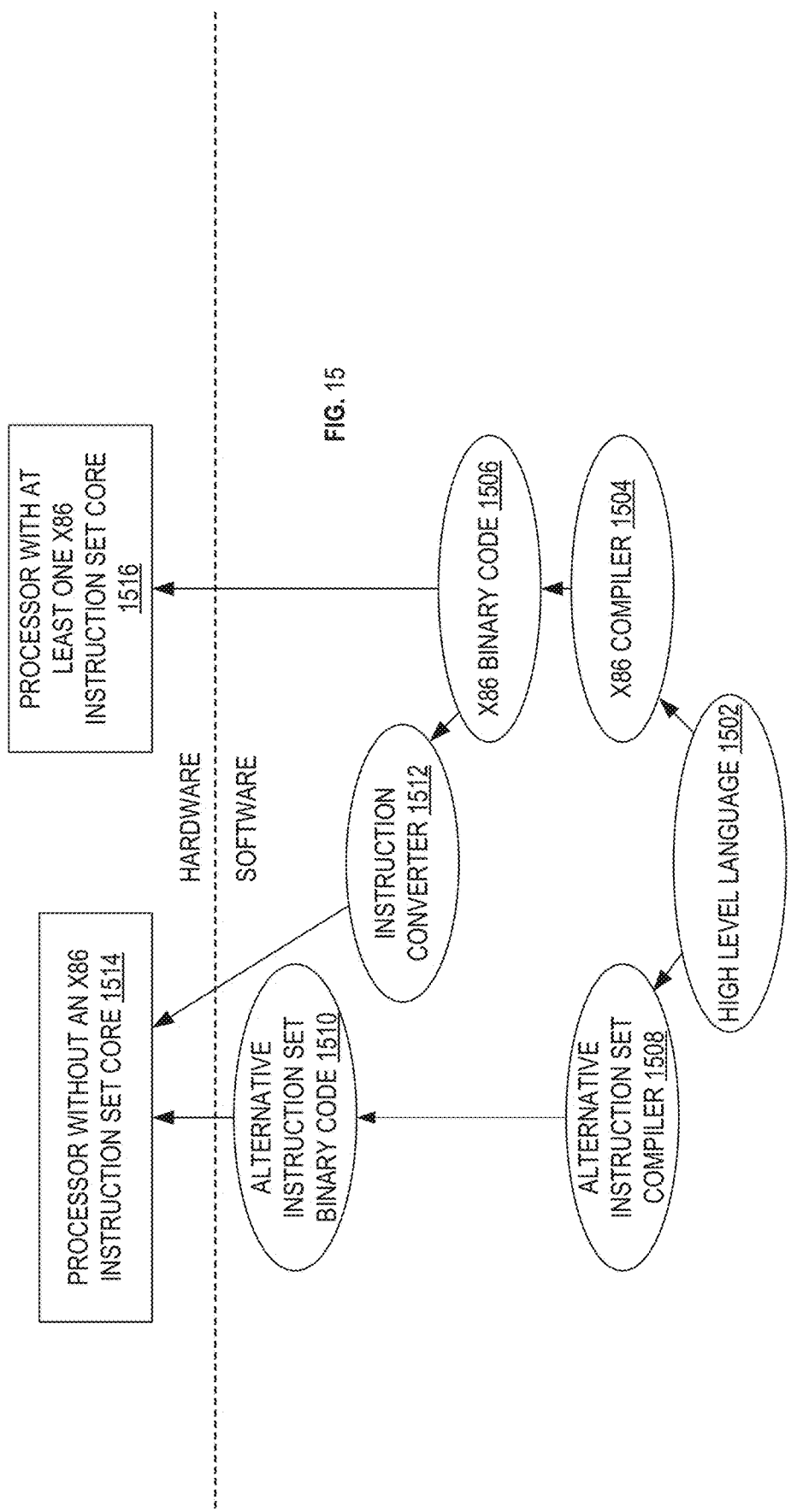
FIG. 15 illustrates a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is

What is claimed is:

1. An integrated circuit to compute an l-bit result of summing m values, rotating the sum by k bits to the left, and adding a summation of n values to the rotated sum, the circuit comprising:
   a first carry save adder to add up m values to generate a first carry and a first sum;
   rotator circuitry to rotate the first carry by k bits to the left to generate a second carry, the rotator circuitry further to rotate the first sum by k bits to the left to generate a second sum;
   a second carry save adder to add up the second carry, the second sum, and the summation of n values to generate a third carry and a third sum, the n values comprising elements $B_1$ to $B_n$;
   a first of two parallel adders to generate a first intermediate result comprising the third carry plus the third sum minus $2^k$;
   a second of two parallel adders to generate a second intermediate result comprising the third carry plus the third sum plus 1;
   a first multiplexer (MUX) to generate bits k+1 to l−1 of the result based on the first and second intermediate results;
   a second MUX to generate bit k of the result based on the first and second intermediate results; and
   a third MUX to generate bits 0 to k−1 of the result based on the first and second intermediate results;
   wherein l-bit result is a concatenation of bits k+1 to l−1 generated by the first MUX, bit k generated by the second MUX, and bits 0 to k−1 generated by the third MUX.

2. The integrated circuit of claim 1, further comprising a MUX control logic to generate control signals for the first, second and third MUXs.

3. The integrated circuit of claim 2, wherein the MUX control logic is to generate control signals based on a set of signals comprising $CP_{l-k}$, $CP_l$, and $CS_k$ signals, the $CP_{l-k}$ signal comprising a portion of the carry propagation of the first carry and the first sum, the $CP_l$ signal comprising a full portion of the carry propagation of the first carry and the first sum, and the $CS_k$ signal comprising a state in which a first k bits of the third carry and the third sum are in at a propagation stage.

4. The integrated circuit of claim 3, wherein the set of control signals further includes an x signal, which is a $k^{th}$ bit of the second intermediate result.

5. The integrated circuit of claim 4, wherein the first MUX is to generate bits k+1 to l−1 of the result by selecting corresponding bits from either the first intermediate result or the second intermediate result based on a first control signal generated by the MUX control logic.

6. The integrated circuit of claim 5, wherein the first control signal is set to:
   a first sub-signal when a 1 is calculated from logic expression:

$(\sim x \& [(CS_k \& CP_l \& CP_{l-k}) | (CS_k \& \sim CP_l \& \sim CP_{l-k})]) | (\sim CS_k \& CP_l \& CP_{l-k}) | (CP_l \& \sim CP_{l-k})$; and a second sub-signal when a 1 is calculated from logic expression:

$(x \& [(CS_k \& CP_l \& CP_{l-k}) | (CS_k \& \sim CP_l \& \sim CP_{l-k})]) | (\sim CP_l \& CP_{l-k}) | (\sim CS_k \& \sim CP_l \& \sim CP_{l-k})$.

7. The integrated circuit of claim 6, wherein the first MUX is to select bits from the first intermediate result when the first control signal is set to the first sub-signal, and bits from the second intermediate result when the first control signal is set to the second sub-signal.

8. The integrated circuit of claim 4, wherein the second MUX is to generate bit k of the result by selecting bit k from the first intermediate result, bit k from the second intermediate result, or an inverse of the bit k from the second intermediate result based on a second control signal generated by the MUX control logic.

9. The integrated circuit of claim 8, wherein the second control signal is set to:
   a third sub-signal when a 1 is calculated from logic expression:

$(\sim CS_k \& CP_l \& CP_{l-k}) | (CP_l \& \sim CP_{l-k})$;

a fourth sub-signal when a 1 is calculated from logic expression:

$(\sim CP_l \& CP_{l-k}) | (\sim CS_k \& \sim CP_l \& \sim CP_{l-k})$; and a fifth sub-signal when a 1 is calculated from logic expression:

$(CS_k \& CP_l \& CP_{l-k}) | (CS_k \& \sim CP_l \& \sim CP_{l-k})$.

10. The integrated circuit of claim 9, wherein the second MUX is to select bit k from the first intermediate result when the second control signal is set to the third sub-signal, bit k from the second intermediate result when the second control signal is set to the fourth sub-signal, and the inverse of the bit k from the second intermediate result when the control signal is set to the fifth sub-signal.

11. The integrated circuit of claim 10, wherein the second MUX is to select the inverse of the bit k from the first intermediate result instead of the second intermediate result when the second control signal is set to the fifth sub-signal.

12. The integrated circuit of claim 4, wherein the third MUX is to generate bits 0 to k−1 of the result by selecting corresponding bits from either the first intermediate result or the second intermediate result based on a third control signal generated by the MUX control logic.

13. The integrated circuit of claim 12, wherein the third control signal is set to:
   a sixth sub-signal when a 1 is calculated from logic expression:

$\sim CP_{l-k}$; and a seventh sub-signal when a 1 is calculated from logic expression:

$CP_{l-k}$.

14. The integrated circuit of claim 13, wherein the third MUX is to select bits from the first intermediate result when the third control signal is set to the sixth sub-signal, and bits from the second intermediate result when the third control signal is set to the seventh sub-signal.

15. The integrated circuit of claim 1, wherein the rotator circuitry is to generate the second carry and the second sum in parallel.

\* \* \* \* \*